3,294,030
POSITIVE DISPLACEMENT SYRUP PUMP
William L. Fox, Niles, Ill., assignor to The Dole Valve Company, Morton Grove, Ill., a corporation of Illinois
Filed Dec. 3, 1964, Ser. No. 415,679
2 Claims. (Cl. 103—150)

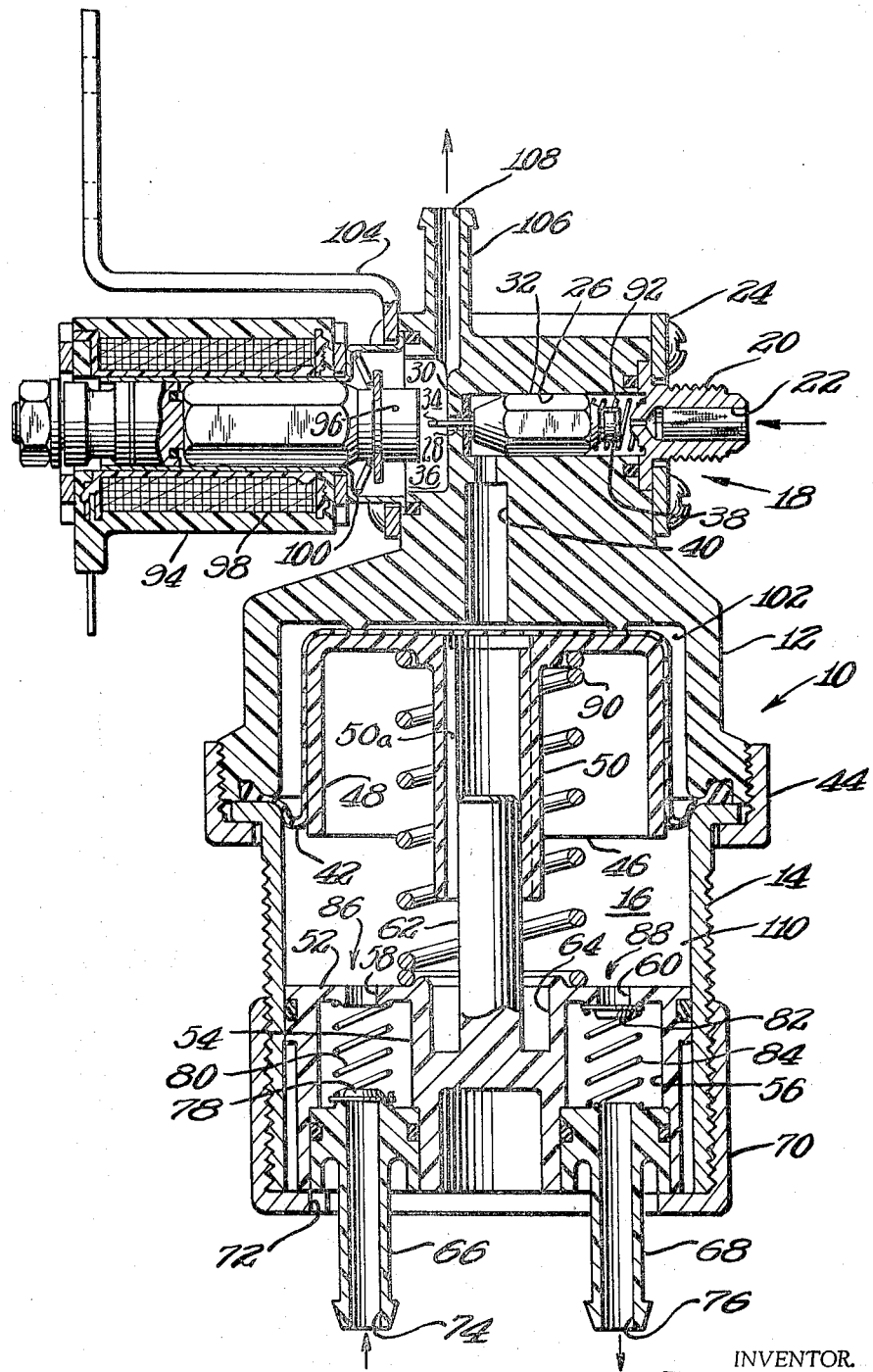

This invention relates generally to displacement pumps and more particularly to positive displacement pumps employed either for metering and dispensing two fluids or for utilizing one fluid as a power source to dispense another fluid.

Displacement pumps are employed for metering a predetermined quantity of fluid and dispensing such fluid into a suitable container upon each cycle of the pump. Dispensing of predetermined quantities of a fluid is required in many industries. However, many processes require metering and dispensing of two separate fluids. For instance, in the soft drink industry a predetermined quantity of syrup and water is required in the process of filling the soft drink bottles. Furthermore, the metering of one of such fluids is dependent upon the quantity required of the other.

It has heretofore been a practice of industry to meter and dispense two fluids with separate displacement pumps for each such fluid. When two pumps are required for dispensing two separate fluids, various problems result in the dispensing process. For instance, it is necessary to synchronize one pump with the other during the process which requires additional mechanisms. Another problem encountered when two such pumps are required is that of providing the proper ratio of one fluid to the other in quantity.

In addition, prior structures for dispensing fluids were not positive in their action of metering. Therefore, exact quantities of the fluid could not be attained during the dispensing process.

It is, therefore, an object of this invention to provide a displacement pump which will meter and dispense two fluids alternatively.

It is another object of this invention to provide a displacement pump which does not require synchronizing mechanisms for dispensing of two quantities of fluid.

Another object of this invention is to provide a displacement pump which does not require separate settings for changing the quantities of the two fluids being dispensed.

Still another object of the present invention is to provide a displacement pump which through positive action of its mechanism provides exact quantities of each fluid being dispensed.

These and other objects will be more fully realized and understood from the novel structure of the present invention which generally includes a body member having a cavity therein, a slug valve in communication with one end of the cavity, a membrane disposed in the cavity and biased toward the one end, and unidirectional valve means disposed in the other end of the cavity.

The invention however will be more fully understood from the following detailed description when taken in conjunction with the accompanying drawing wherein there is shown a side elevational view in section of the preferred form of the present invention.

With reference to the drawing in detail, the body of the pump is generally designated with the reference numeral 10 and includes an end member 12 and a cylindrical portion 14. A cavity 16 is partially formed by the cylindrical member 14 and extends into the end member 12. A slug valve generally designated with the reference numeral 18 is disposed in end member 12 for metering one of the fluids.

A threaded coupling 20 includes an inlet passage 22 for connection to a supply of one fluid. Coupling 20 is secured to the body member by means of a plate 24. A valve chamber 26 is disposed in body member 10 and terminates in an outlet passage 28 at one end thereof. A valve seat 30 is disposed in the one end of the valve chamber and includes an aperture in alignment with passage 28. Passage 28, valve chamber 26, and inlet passage 22 are coaxially aligned with one another. Valve chamber 26 is preferably cylindrical in shape.

A valve member or a piston 32 is disposed in chamber 26 and is preferably polygonal in shape to allow passage of fluid therearound. A plunger 34 extends from one end of the valve member through the passage 28 and into a recessed portion 36 of the body member. The other end of valve member 32 includes a substantially T-shaped head having a resilient seating material 38 thereon.

A passage 40 is disposed between valve chamber 26 and cavity 16 for providing fluid communication therebetween. A flexible membrane 42 is sealingly secured around its peripheral edge between end member 12 and cylindrical portion 14. This sealing engagement is provided by member 44 engaging a flange end of cylindrical portion 14 and threadably engaged with end member 12. The flexible membrane is disposed between cylindrical portion 14 and end member 12 and member 44 is tightened on its respective threads to provide the proper sealing. A support member 46 includes an annular flange 48 for supporting membrane 42 within cavity 16. Support member 46 includes a central bushing 50 for allowing longitudinal movement within cavity 16.

Disposed within the cavity is a valve housing 52 having a pair of bores 54 and 56 therein terminating in ports 58 and 60 respectively. A stem 62 extends from the valve housing for supporting bushing 50 thereon. A recess 64 is disposed in the valve housing for receiving the end of bushing 50 during longitudinal movement of support member 46. A groove 51 is provided on an inner surface of bushing 50 to allow relief of pressure therein during the relative movement of the bushing with the stem 62. An inlet coupling 66 is disposed within the bore 54 and an outlet coupling 68 is disposed within bore 56. A cap 70 is threadably engaged with cylindrical portion 14 for retaining the valve housing and couplings 66 and 68 within cavity 16. Cap 70 is provided with a recessed portion 72 which allows withdrawal of the coupling members from the valve housing for purposes of cleaning and replacement. As shown, the cap is rotated to a position wherein recess 72 allows removal of coupling member 66. Coupling 66 is provided with an inlet passage 74 and coupling 68 with an outlet passage 76. A valve cap 78 is provided within the bore 54 and is biased by a spring 80 against one end of passage 74. Similarly, a cap 82 is provided in bore 56 and biased by a spring 84 against port 60 therein. This arrangement of structures provides an inlet valve generally designated with the reference numeral 86 consisting of coupling 66, cap 78, spring 80 and port 58. Also, an outlet valve generally designated with the reference numeral 88 is formed by the structures of coupling 68, cap 82, spring 84 and port 60. Inlet and outlet valves 86 and 88 provide unidirectional fluid flow into and out of cavity 16 respectively.

In the present preferred form of the invention a spring 90 is disposed between the valve housing 52 and the membrane support member for biasing the membrane and the support toward one end of cavity 16. Coupling members 66 and 68 are flared at their terminal points to receive conduit or pipe thereon. Coupling 66 is disposed for connection to a supply and coupling 68 is disposed for connection to an output. It can be seen, therefore, that as spring 90 biases support 46 and membrane 42 and causes longitudinal movement thereof within cavity 16, fluid will be drawn into the cavity from a supply through inlet valve 86. Consequently, as a force is applied to move membrane 42 and support 46 against the bias of spring 90, the fluid existing in cavity 16 will be forced through valve 88 to passage 76 of coupling member 68.

This pumping operation provided between coupling 66 and coupling 68 is promoted by the operation of slug valve 18.

Valve member 32 is biased to engage seat 30 by means of a spring 92. The valve member is disposed for movement within the valve chamber against the bias of spring 92 to seat against and seal passage 22. Movement of valve member 32 is provided by the action of a solenoid 94 applying a longitudinal force on plunger 34. This force is exerted on plunger 34 by an armature 96 which is electromagnetically controlled by means of a winding 98 and biased by a spring 100. In the position shown, winding 98 is energized and armature 96 is withdrawn into the solenoid. When winding 98 is de-energized, spring 100 biases armature 96 against plunger 34, causing movement of valve member 32 toward and in sealing engagement with passage 22. Movement of valve member 32, however, is not sufficient to allow closure of passage 28 by armature 96. Therefore, when the valve member is seated against seat 30, a fluid path is provided through passage 22, valve chamber 26, and passage 40 into an upper section 102 of cavity 16. When the valve member is seated against passage 22, a fluid path is provided from section 102 through passage 40, chamber 26, passage 28, and into recess 36. Solenoid 94 is sealingly secured to the body member around recess 36 by means of a plate and mounting bracket 104. An outlet coupling 106 includes an outlet passage 108 in fluid communication with recess 36 to allow fluid to escape therefrom. Coupling 106 is flared to receive conduit or pipe for ultimate connection to an output.

In operation, the mechanism performs to provide either two metered quantities of separate fluids or to provide pumping of one fluid by another fluid acting as a power source. This is accomplished by conditions of pressure unbalance resulting from open and/or closed ports which tend to move physical members so that a fluid is moved. A supply of fluid, such as water, is connected to coupling 20 and the fluid is admitted into passage 22. Until solenoid 94 is actuated, valve piece 32 seats against the end of passage 22 and spring 100 is sufficient to counteract any fluid pressure encountered therein. When winding 98 is actuated, armature 96 is withdrawn therein allowing spring 92 to seat the valve member against seat 30. As illustrated in the drawing, the valve member has just opened and fluid is admitted into chamber 26, around the valve member and into passage 40, and into the upper section of cavity 16. Sufficient pressure is maintained at the fluid supply to force membrane 42 and support 46 downwardly into cavity 16 against the bias of spring 90. Support 46 is forced in a downward longitudinal direction by the fluid filling upper section 102 until it engages with housing 52. During the downward longitudinal movement of support 46, any fluid which exists in a lower section 110 of cavity 16 is forced out of the cavity through valve 88 and coupling 68. When winding 98 is deenergized, spring 100 forces armature 96 against plunger 34, causing movement of valve member 32 and closure of passage 22. Passage 108 is then placed in fluid communication with upper section 102 of the cavity and fluid is allowed to flow freely through passages 40, 28 and 108 to an output.

Spring 90 forces support 46 and membrane 42 in an upward longitudinal direction thereby drawing fluid into coupling 66 through valve 86. Coupling 66 may be connected to a supply of fluid such as a syrup. Therefore, with each quantity of fluid metered by slug valve 18, another quantity of another fluid is metered and dispensed through valves 86 and 88. The quantities of each fluid can be increased by unscrewing cap 70 the prescribed distance from portion 14.

The entire mechanism is provided with sealing rings at appropriate locations to maintain a fluid tight connection between the structural elements. Membrane 42 provides by means of its peripheral edge a sealing ring between the portion 14 and end member 12.

The principles of the invention explained in connection with the specific exemplification thereon will suggest many other applications and modifications of the same. It is accordingly desired that, in construing the breadth of the appended claims they shall not be limited to the specific detail shown and described in connection with the exemplification thereof.

What is claimed is:

1. A displacement pump comprising
   a body member having a cavity therein,
   one end of said body member having a valve chamber therein and a pair of passages each extending from a respective end of said valve chamber,
   a valve member disposed in said valve chamber,
   the valve chamber being in fluid communication with one end of said cavity,
   a first biasing means for biasing said valve member to one position of sealing engagement with one of said passages,
   means for removing the force of said first bias means acting upon said valve member,
   a second bias means for biasing the said valve member in a sealing engagement with the other of said passages when said first bias means is inoperative upon said valve member,
   a flexible membrane sealingly secured within said cavity, and
   means for biasing said membrane toward the one end of said cavity.

2. The pump of claim 1 wherein means for removing said biasing means includes a solenoid, having a coil and armature, and a plunger secured to said valve member, said plunger adapted to cooperate with said armature, wherein said first bias means forces said armature toward said valve member depressing said plunger, thereby moving said valve member into a sealing engagement with one of said passages, whereby energization of said coil moves said armature away from said valve member, disengaging said armature from said plunger, whereupon said second bias means forces said valve member into a sealing engagement with the other of said passages.

References Cited by the Examiner
UNITED STATES PATENTS

| | | | |
|---|---|---|---|
| 2,506,434 | 5/1950 | Quimper | 103—44 |
| 2,526,331 | 10/1950 | Copping | 103—44 |
| 2,711,134 | 6/1955 | Hughes | 103—44 |
| 2,868,494 | 1/1959 | Kearns et al. | 251—129 |
| 2,916,051 | 12/1959 | Taylor | 157—625.64 |
| 2,954,737 | 10/1960 | Hoover | 103—47 |
| 2,960,038 | 11/1960 | Lupfer et al. | 103—152 |
| 3,004,528 | 10/1961 | Logan et al. | 137—625.64 |

MARK NEWMAN, *Primary Examiner.*

W. L. FREEH, *Assistant Examiner.*